United States Patent
Faingersh et al.

(10) Patent No.: US 10,630,070 B2
(45) Date of Patent: Apr. 21, 2020

(54) DEVICE AND METHOD FOR OVERCURRENT PROTECTION

(71) Applicants: Alexander Faingersh, Shaked (IL); Valentin Lerner, Petah tikva (IL); Erez Sarig, Kadima (IL); Raz Reshef, Netanya (IL)

(72) Inventors: Alexander Faingersh, Shaked (IL); Valentin Lerner, Petah tikva (IL); Erez Sarig, Kadima (IL); Raz Reshef, Netanya (IL)

( * ) Notice: Subject to any disclaimer, the term of this patent is extended or adjusted under 35 U.S.C. 154(b) by 367 days.

(21) Appl. No.: 15/489,910

(22) Filed: Apr. 18, 2017

(65) Prior Publication Data
US 2018/0301896 A1    Oct. 18, 2018

(51) Int. Cl.
H02H 9/02    (2006.01)
(52) U.S. Cl.
CPC .................... *H02H 9/02* (2013.01)
(58) Field of Classification Search
CPC ....................................... H02H 9/02
USPC ....................................... 361/93.9
See application file for complete search history.

(56) References Cited

U.S. PATENT DOCUMENTS

| | | | | |
|---|---|---|---|---|
| 5,369,308 A | * | 11/1994 | Schoofs | H03K 17/0822 327/374 |
| 7,622,902 B1 | * | 11/2009 | Kao | G05F 1/575 323/276 |
| 7,852,054 B2 | * | 12/2010 | Kao | G05F 1/573 323/277 |
| 8,841,897 B2 | * | 9/2014 | Williams | G05F 1/5735 323/285 |
| 2015/0016005 A1 | * | 1/2015 | Simonson | H02H 9/025 361/93.9 |

* cited by examiner

*Primary Examiner* — Dharti H Patel
(74) *Attorney, Agent, or Firm* — Reches Patents

(57) ABSTRACT

A device for overcurrent protection, the device may include a main transistor that is configured to supply, via an output node, a load current to a load; a current limiting resistor; a replica transistor that is configured to provide a replica current to the current limiting resistor; wherein the replica current is smaller than the load current, wherein a value of the replica current is responsive to a value of the load current; an amplifier; a current limiting transistor; a variable signal source that is configured to output a reference signal; wherein a value of the reference signal is based on a main transistor voltage; wherein the amplifier is configured to prevent the load current from exceeding a first load current threshold by biasing the main transistor and the replica transistor with a bias signal; wherein a value of the bias signal is responsive to the reference signal and to the replica current.

14 Claims, 10 Drawing Sheets

DEVICE AND METHOD FOR OVERCURRENT PROTECTION

BACKGROUND OF THE INVENTION

A device may be required to supply current to a load. The load may drain currents of different values and there is a need to set an upper limit to the current that may be supplied to the load.

SUMMARY OF THE INVENTION

There may be provided a device for overcurrent protection, the device may include a main transistor that may be configured to supply, via an output node, a load current to a load; a current limiting resistor; a replica transistor that may be configured to provide a replica current to the current limiting resistor; wherein the replica current may be smaller than the load current, wherein a value of the replica current may be responsive to a value of the load current; an amplifier; a current limiting transistor; a variable signal source that may be configured to output a reference signal; wherein a value of the reference signal may be based on a main transistor voltage. The amplifier may be configured to prevent the load current from exceeding a first load current threshold by biasing the main transistor and the replica transistor with a bias signal; wherein a value of the bias signal may be responsive to the reference signal and to the replica current.

The reference signal may be a reference voltage; wherein the reference signal source may be configured to provide a reference voltage of a first value when the load current may be smaller by a first amount (for example—9.5 Ampere) of the first load current threshold and may be configured to provide a reference voltage of a second value when the load current exceeds a second amount (for example 10.5 Ampere) of the first load current threshold. The first and second amounts may differ from 9.5 and 10.5 Amperes respectively. The first and second amounts may be tuned by designer according to process or/and application needs.

The control device may be configured to gradually (for example—by a rate of dVref/dVds=1.15) change the value of the reference signal between the first value and the second value. The rate may differ from 1.15 and may, for example, be determined by a designer and can be tuned according to application needs and specific process.

The main circuit may include a main transistor; wherein the reference signal source may be configured to output the reference signal source of the first value when the main transistor operates in a linear mode and may be configured to output the reference signal of the second value when the main transistor operates in a saturation mode.

There may be provided a device for overcurrent protection, the device may include: a main circuit that may be configured to supply, via an output node, a load current to a load; a replica circuit that may be configured to provide a replica current that may be smaller than the load current, wherein a value of the replica current may be responsive to a value of the load current; and a control circuit that may be configured to prevent the load current from exceeding a first load current threshold by biasing the main circuit and the replica circuit, wherein the biasing may be responsive to a difference between (i) a reference voltage provided by a reference signal source of the control circuit and (ii) a voltage that may be developed on a current limiting resistor, wherein the voltage that may be developed on the current limiting resistor may be responsive to a value of the replica current.

The reference signal source may be a variable reference signal source.

The control circuit may be configured to determine a value of the reference voltage based on a main circuit voltage.

The control circuit may be configured to change the value of the reference voltage between a first value and a second value, wherein the second value exceeds the first value.

The reference signal may be a reference voltage; wherein the reference signal source may be configured to provide a reference voltage of a first value when the load current may be smaller by a first amount (for example—9.5 Ampere) of the first load current threshold and may be configured to provide a reference voltage of a second value when the load current exceeds a second amount (for example 10.5 Ampere) of the first load current threshold. The first and second amounts may differ from 9.5 and 10.5 Amperes respectively. The first and second amounts may be tuned by designer according to process or/and application needs.

The device according to wherein the control device may be configured to gradually (for example—by a rate of dVref/dVds=1.15) change the value of the reference signal between the first value and the second value. The rate may differ from 1.15 and may, for example, be determined by a designer and can be tuned according to application needs and specific process.

The main circuit may include a main transistor; wherein the reference signal source may be configured to output the reference signal source of the first value when the main transistor operates in a linear mode and may be configured to output the reference signal of the second value when the main transistor operates in a saturation mode.

The reference signal source may include a current source and a fixed resistor that may be coupled in parallel to a variable resistor.

The variable resistor has a resistance that may be responsive to a value of a main circuit voltage.

The control circuit may include an amplifier, a current limiting resistor that may be coupled between the output node and a first input of the amplifier; and wherein the reference signal source may be coupled between the output node and a second input of the amplifier.

The amplifier may include an amplifier output that may be configured to outputs a bias signal to the main circuit and to the replica circuit.

There may be provided a method for overcurrent protection, the device may include: supplying, by a main transistor and via an output node, a load current to a load; providing, by a replica transistor, a replica current to a current limiting resistor; wherein the replica current may be smaller than the load current, wherein a value of the replica current may be responsive to a value of the load current; outputting, by a variable signal source, a reference signal; wherein a value of the reference signal may be based on a main transistor voltage; preventing, by an amplifier, the load current from exceeding a first load current threshold by biasing the main transistor and the replica transistor with a bias signal; wherein a value of the bias signal may be responsive to the reference signal and to the replica current.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS

Figure 1:
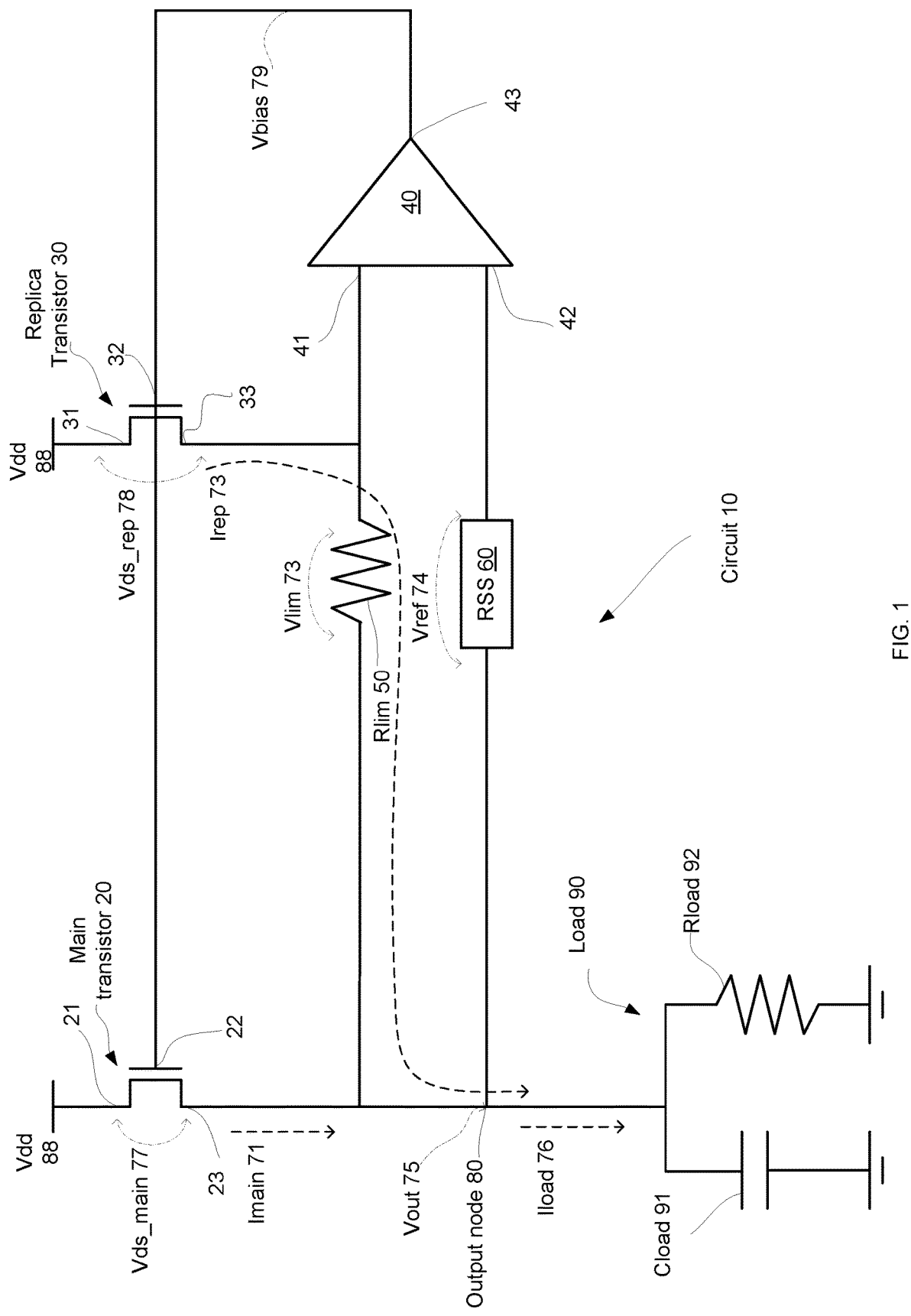
FIG. 1 is an example of a device.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

FIG. 1 illustrates an example of a device 10 and load 90.

Load 90 is represented by a load resistance Rload 92 and a load capacitance Cload 91.

Load 90 is connected to device 10 via output node 80. The voltage at the output node is referred to as output voltage Vout 75.

Device 10 includes a main transistor 20, a replica transistor 30, amplifier 40, current limiting resistor (denoted Rlim 50) and a reference signal source 60. The term "main" indicates that main transistor 20 (and not replica transistor 30) is the main source of current to the load.

In FIG. 1 the main transistor 20 and the replica transistor 30 are NMOS transistors but other transistors may be provided. Furthermore—the main transistor and the replica transistor are merely non-limiting examples of a main circuit and a replica circuit. The main circuit is configured to supply current to load 90 while the replica circuit is configured to supply a replica current that is a fraction of the load circuit.

The drain 21 of main transistor 20 and the drain 31 of replica transistor 30 are connected to a voltage supply Vdd 88. The gate 22 of main transistor 20 and the gate 32 of replica transistor 30 are connected to an amplifier output 43 of amplifier 40. The source 23 of main transistor 20 is connected to output node 80. The source 33 of replica transistor 30 is connected to first input 41 of amplifier 40.

Current limiting resistor Rlim 50 is connected between output node 80 and the first input 41 of amplifier 40.

Reference signal source 60 is coupled between output node 80 and second input 42 of the amplifier 40.

In FIG. 1 the first input 41 is an inverting input of amplifier 40 and second input 42 is a non-inverting input of amplifier 40.

The value of current limiting resistor Rlim 50 affects the maximal load current that is supplied by device 10 to load 90.

Rlim 50 may, for example, be an external component that may be selected by the user (or manufacturer) of device 10.

Main transistor 20 is configured to supply, via output node 80, a load current Iload 76 to a load 90.

Figure 2:
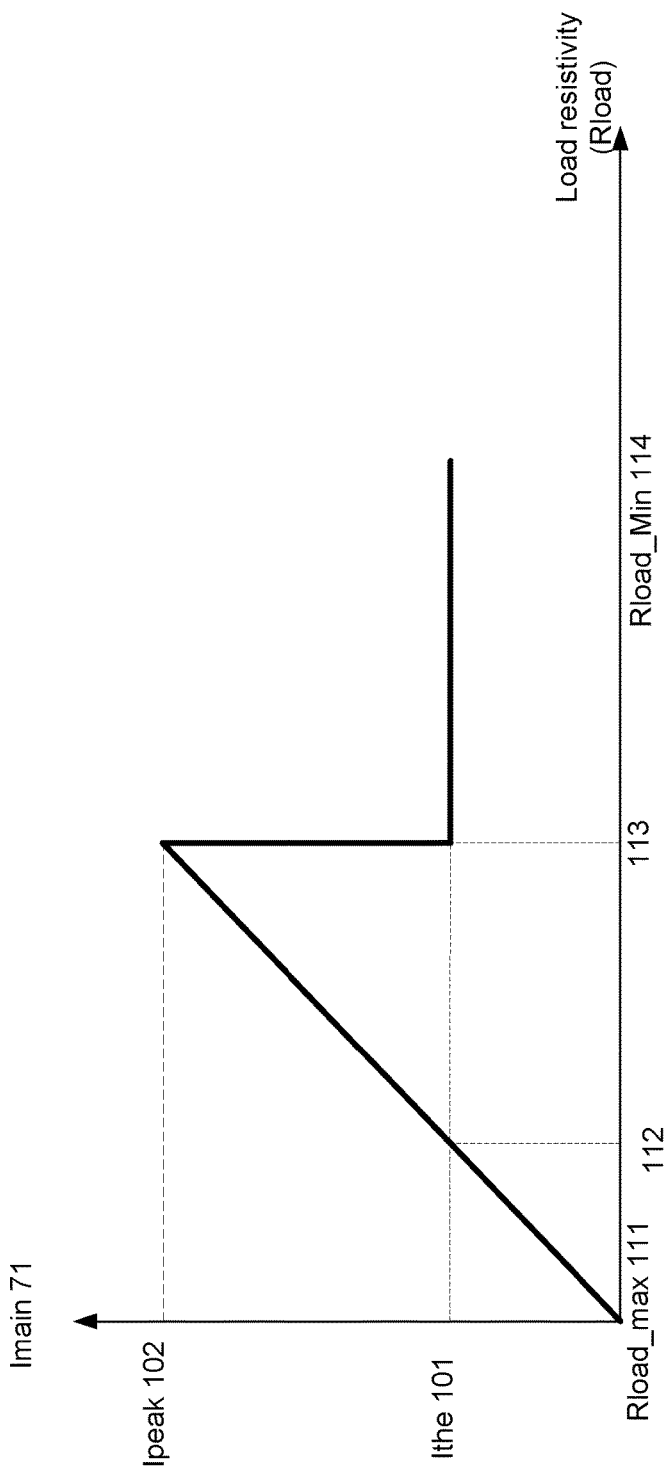
FIG. 2 illustrates various currents.

Iload 76 should not exceed a predefined load current threshold Ithe (denoted 101 in FIG. 2). When Iload 76 is below the threshold—main transistor 20 and replica transistor 30 operate in a linear mode. When device 10 limits Iload 76—the main transistor 20 and the replica transistor 30 may operate in a saturation mode.

Amplifier 40 outputs a bias signal Vbias 79 to the gate 22 of the main transistor 20 and to the gate 32 of the replica transistor 30.

When Vref 74 exceeds Vlim 173 the amplifier 40 outputs Vbias 79 at a value that maintains main transistor 20 and replica transistor 30 in a linear mode. When Vlim 173 exceeds Vref 74 the amplifier 40 outputs Vbias 79 that may induce main transistor 20 and replica transistor 30 to operate in the saturation mode.

Main current (denoted Imain 71) flows from source 23 of main transistor 20 to load 90. In addition, Replica current Irep 73 flows from source 33 of replica transistor 30 to load 90, through Rlim 50 and output node 80.

The voltage developed on Rlim 50 is denoted Vlim 173 and equals Irep×Rlim.

Because Imain 71 well exceeds Irep 73 it is assumed that Imain 71 equals the load current Iload 76.

When the main transistor 20 and the replica transistor 30 are fed with the same voltages the ratio between Imain 71 and Irep 73 should be the ratio (K) between the current supply capabilities of the main transistor 20 and the replica transistor 30. Under these conditions—in order to prevent Iload 76 from exceeding a load threshold (Ith) the replica current should not exceed Ith/K (or—when considering the difference between Iload and Imain—Ith should not exceed Ith/(K+1)).

It should be noted that the source drain voltage Vds_main 77 of the main transistor 20 exceeds (by Vlim 173) the source drain voltage Vds_rep 78 of the replica transistor 30.

Accordingly—when the main transistor 20 and the replica transistor 30 operate in a linear mode—the replica transistor 30 is less conductive than main transistor 20. This causes replica current Irep 73 to be smaller than Imain/K.

Because Irep 73 is monitored by device 10 in order to prevent Iload overload—the smaller than expected Irep will cause the device 10 to limit the load current at a value Ipeak that exceeds Ithe.

FIG. 2 illustrates that device 10 will limit the load current to a value (Ithe 101) that substantially equals Ishort=K*Vref/Rlim. Nevertheless—the load current will be limited only after reaching Ipeak 102.

In FIG. 2 different load currents are associated with different values of Rload 92. These values range between a maximal value Rload max 111 and a minimal value Rload min 114. The load current will range between Ithe 101 and Ipeak 102 (thereby presenting a current overload) at an intermediate range of Rload between values 112-113.

It should be noted that the difference (which equals Vlim) between Vds_main 77 and Vds_rep 78 can be reduced (thereby reducing the deviation of Irep from Imain/K) by reducing the value of Vref. Nevertheless—using a small Vref will make the Ithe target more sensitive to mismatch, offsets of amplifier and noise.

It should be noted that the reference signal source 60 may be a fixed reference signal source or may be an adjustable reference signal source that may change the value of Vref 74.

The value of Vref 74 may be a function of a value of the state of the main transistor 20. For example—the value of Vref may be a function of Vds_main 77.

Figure 3:
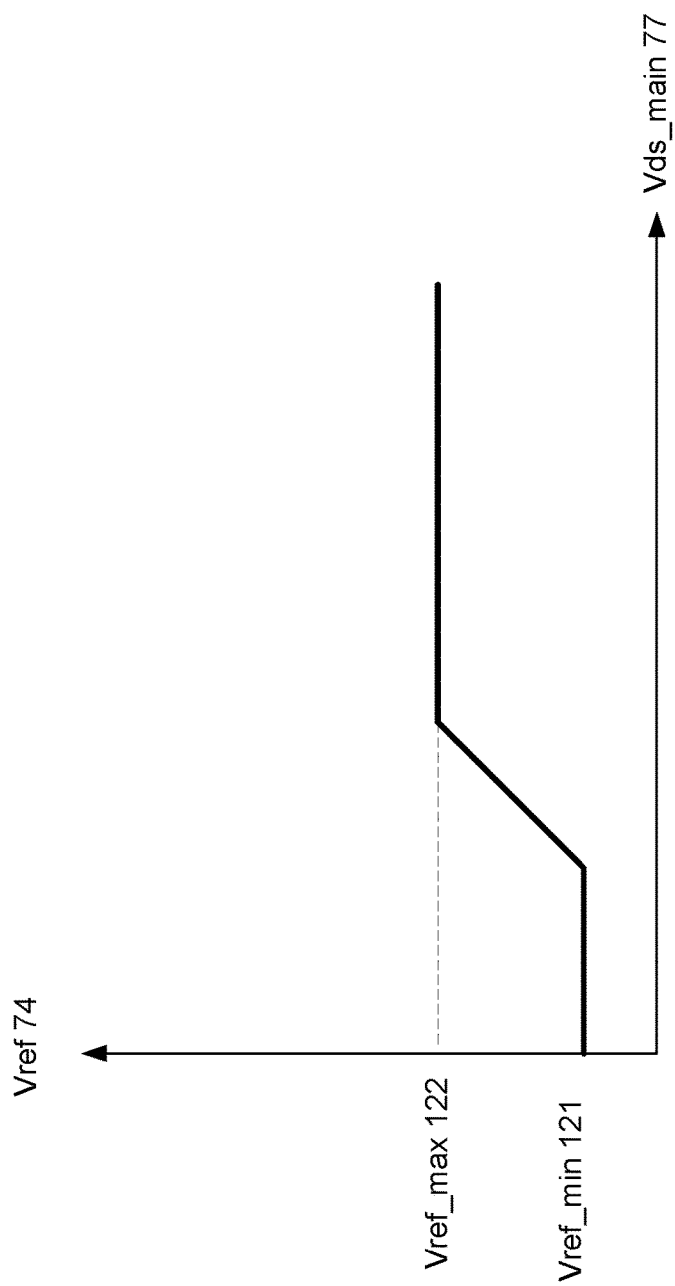
FIG. 3 illustrates various values of a reference voltage.

FIG. 3 illustrates an example of a change of Vref as a function of Vds_main 77.

Vref 74 is set to a minimal value Vref_min 121 when the main transistor 20 operates in a linear mode. This will result in a minimal difference between Vds_main 77 and Vds_rep 78—and cause Irep 73 to better follow Imain 71—to have a value that is closer to Imain/K.

Figure 4:
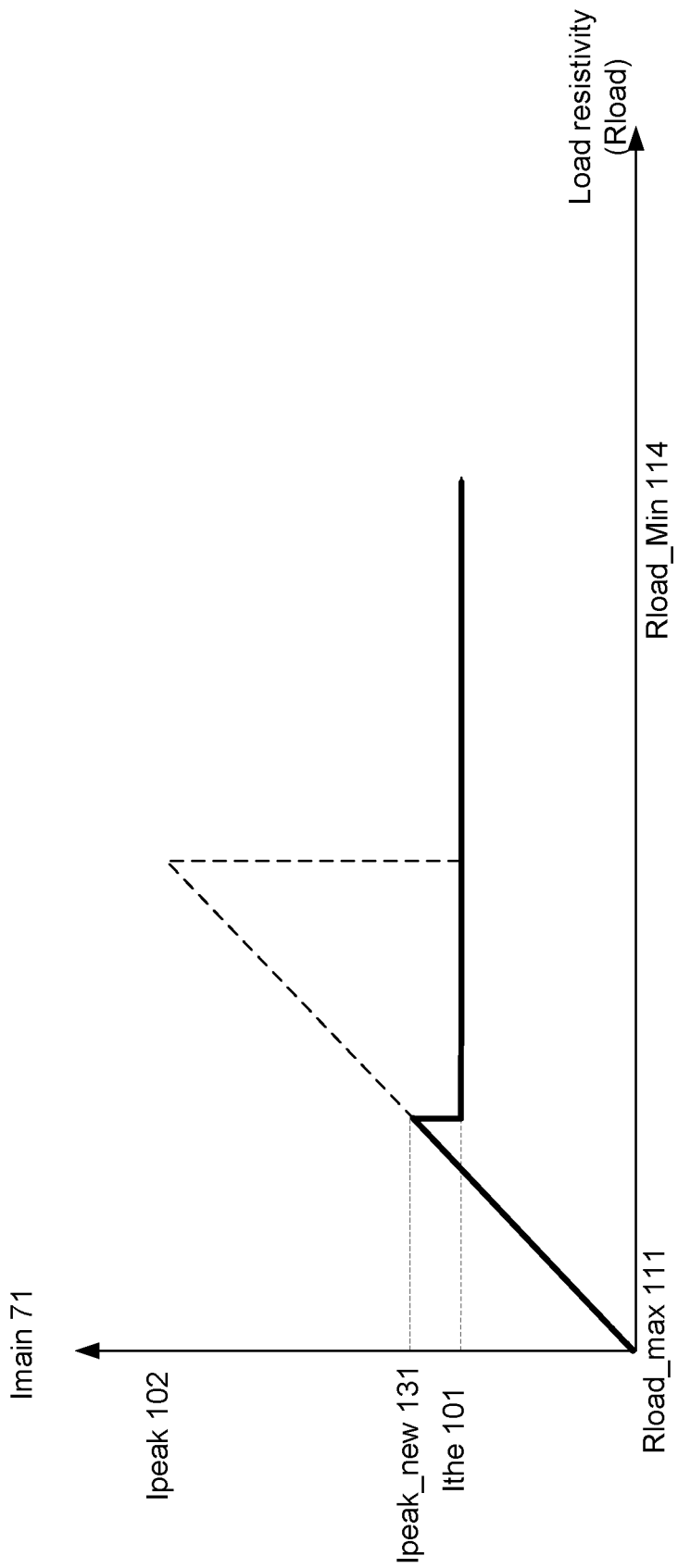
FIG. 4 illustrates various currents.

FIG. 4 illustrates that when Vref_min 121 is supplied by the reference signal source 60—then an overcurrent situation is detected at a load current value of Inew-peak 131 that is much smaller than Ipeak 102.

For lower Rload values the reference signal source 60 will supply Vref 74 that may rise until reaching a maximal value Vref_max 122.

The value of Vref 74 may be changed (between Vref_min 121 and Vref_max 122) in various manners. For example—Vref 74 can be changed in a gradual manner, may track Vds_main 77 (As shown in FIG. 3), may track Vds_rep 78, and the like.

The reference signal source 60 may output a variable reference signal by changing at least one out a resistivity of reference signal source 60 and/or a current supplied by the reference signal source 60.

Figure 5:
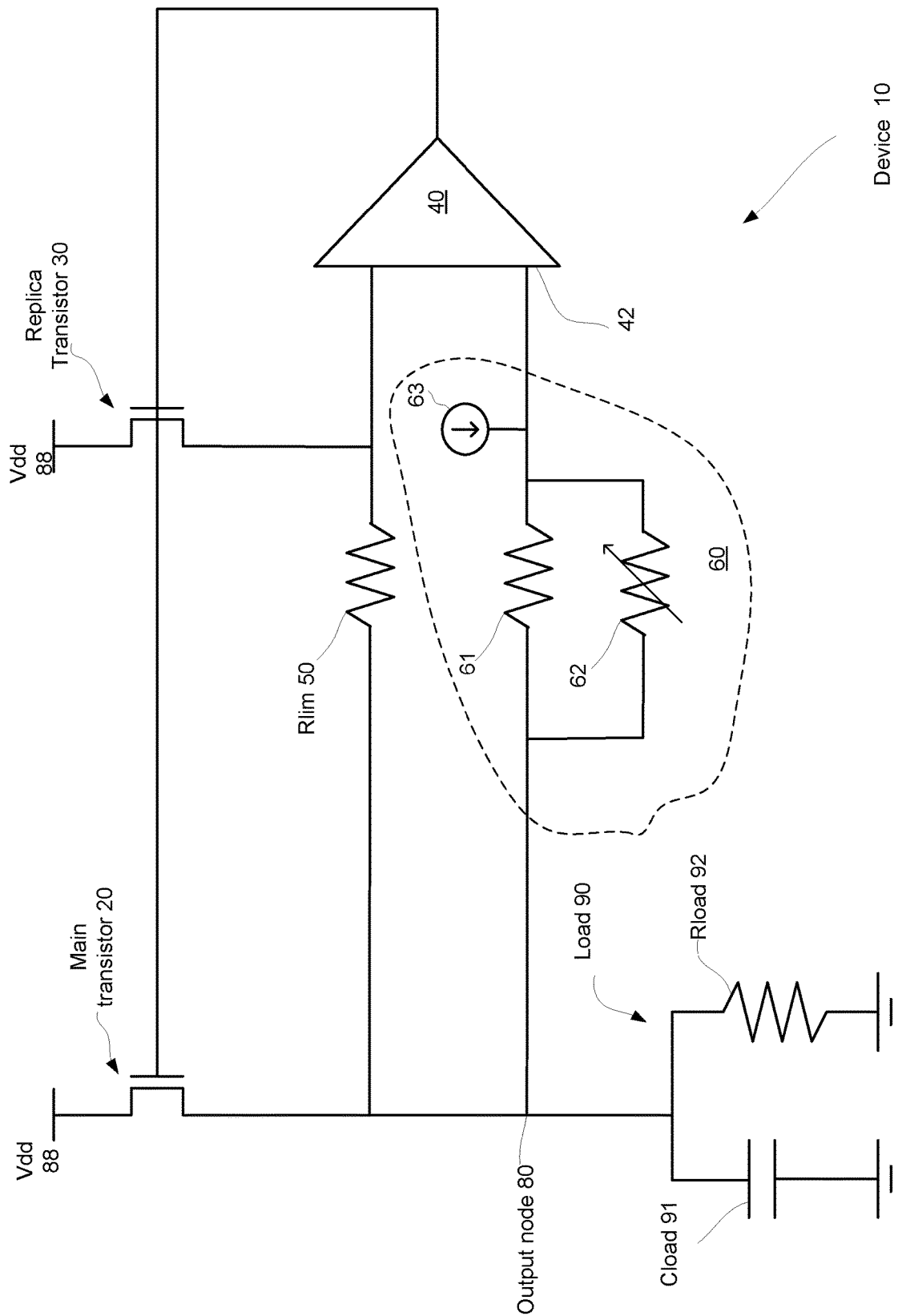
FIG. 5 is an example of a device.

FIG. 5 illustrates reference signal source 60 as including a reference current source 63, fixed resistor 61 and adjustable resistor 62.

Fixed resistor 61 and adjustable resistor 62 may be replaced by a single variable resistor or by any circuit of adjustable resistivity.

Fixed resistor 61 and adjustable resistor 62 are connected to each other in parallel—between output node 80 and second input 42 of amplifier 40. The resistivity of adjustable resistor 62 may be a function of Vds_main 77.

Reference current source 63 may supply a fixed or an adjustable reference current to the second input 42 of amplifier 40.

Figure 6:
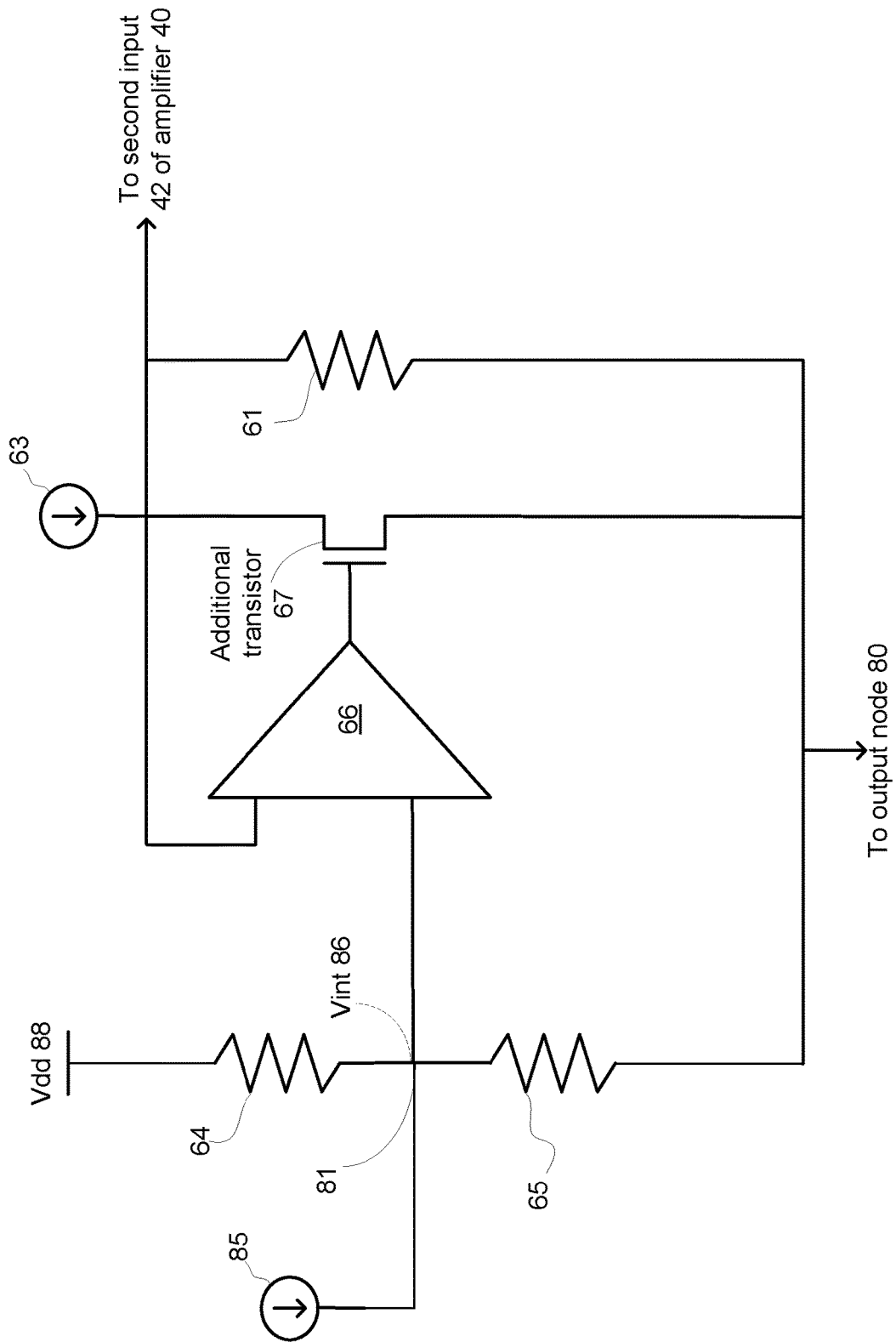
FIG. 6 is an example of a reference signal source.

FIG. 6 illustrates a reference signal source 60 that includes first and second input resistors 64 and 65, additional amplifier 66, additional transistor 67, fixed resistor 61, additional current source 85 and reference current source 63.

First and second input resistors 64 and 65 form a voltage divider that is connected between Vdd 88 and output node 80 so that the voltage drop on the voltage divider equals Vds_main 77.

A first input of additional amplifier 66 is connected to the second input 42 of amplifier 40.

A second input of additional amplifier 66 is connected to an input node 81 that is connected between first and second input resistors 64 and 65. The voltage of the input node 81 is referred to as intermediate voltage Vint 86 and equals Vds_main*R65/(R65+R64).

The input node 81 may also fed by additional current source 85—that supplies a minimal current to guarantee that the value of Vint 86 does not fall below a minimal value (Imin*R65)—even when Vds_main 77 is small.

The additional amplifier 66 biases additional transistor 67 and sets the resistivity of the additional transistor 67. The biasing is responsive to the value of Vds_main 77.

Figure 7:
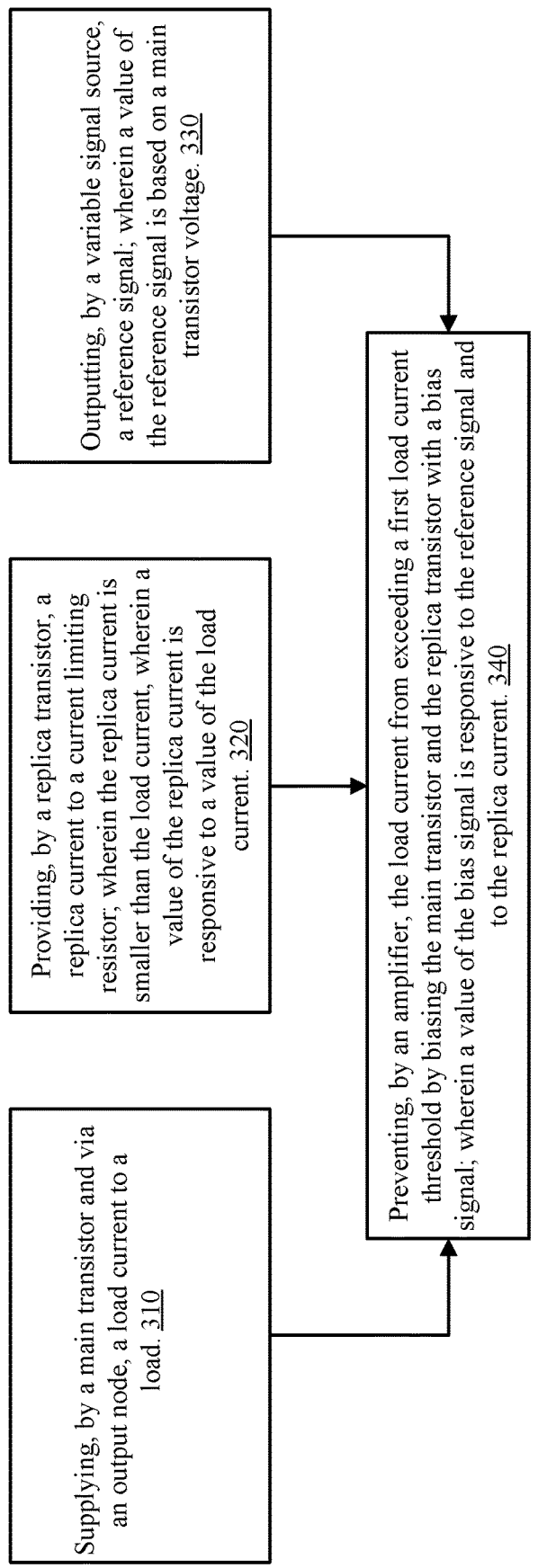
FIG. 7 is an example of a method.

FIG. 7 illustrates an example of a method 300.

Method 300 may include activating any of the devices mentioned above.

Method 300 starts by steps 310, 320 and 330.

Step 310 may include supplying, by a main transistor and via an output node, a load current to a load.

Step 320 may include providing, by a replica transistor, a replica current to a current limiting resistor; wherein the replica current is smaller than the load current, wherein a value of the replica current is responsive to a value of the load current.

Step 330 may include outputting, by a variable signal source, a reference signal; wherein a value of the reference signal is based on a main transistor voltage.

Steps 310, 320 and 330 may be followed by step 340 of preventing, by an amplifier, the load current from exceeding a first load current threshold by biasing the main transistor and the replica transistor with a bias signal; wherein a value of the bias signal is responsive to the reference signal and to the replica current.

Figure 8:
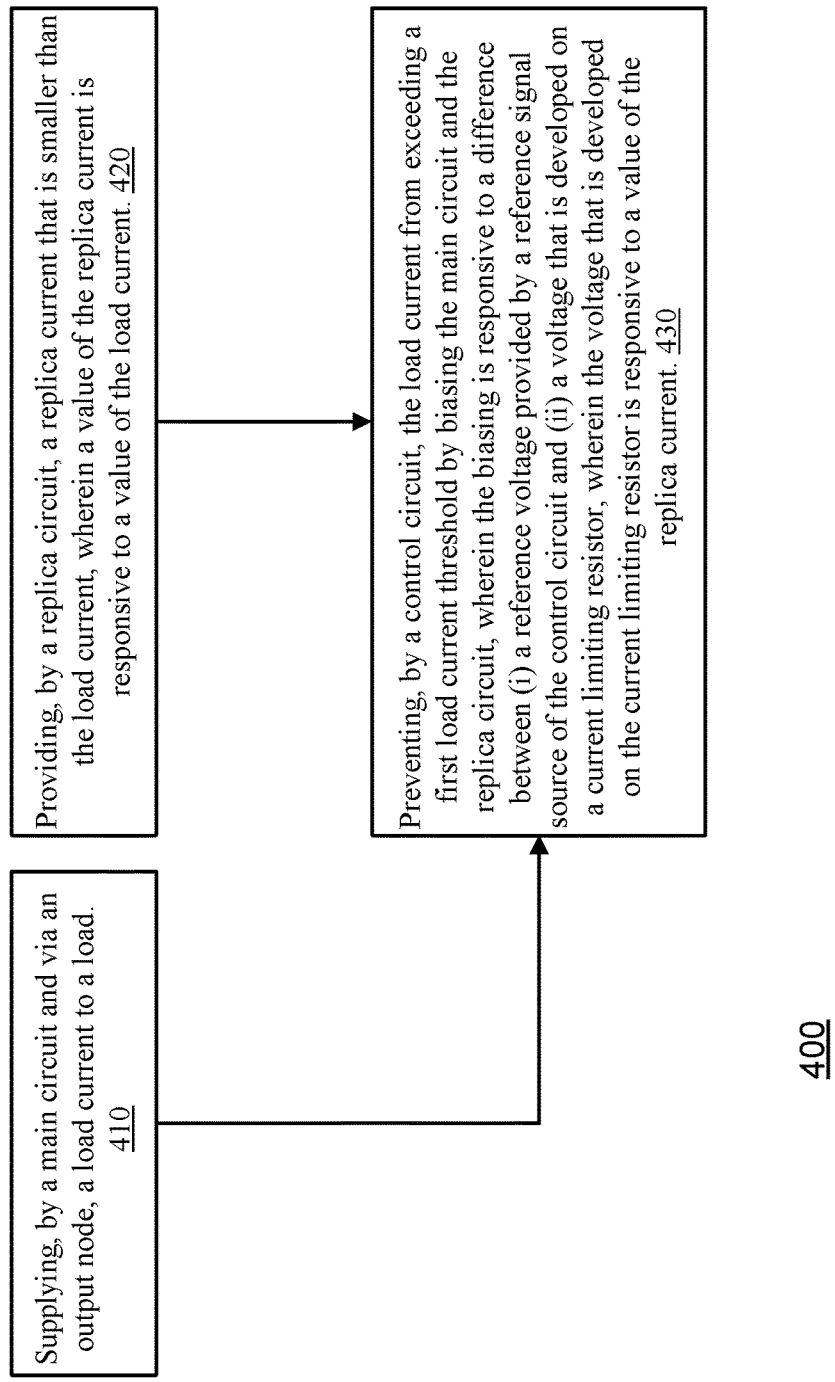
FIG. 8 is an example of a method.

FIG. 8 illustrates an example of method 400.

Method 400 may start by steps 410 and 420.

Step 410 may include supplying, by a main circuit and via an output node, a load current to a load.

Step 420 may include providing, by a replica circuit, a replica current that is smaller than the load current, wherein a value of the replica current is responsive to a value of the load current.

Steps 410 and 420 may be followed by step 430 of preventing, by a control circuit, the load current from exceeding a first load current threshold by biasing the main circuit and the replica circuit, wherein the biasing is responsive to a difference between (i) a reference voltage provided by a reference signal source of the control circuit and (ii) a voltage that is developed on a current limiting resistor, wherein the voltage that is developed on the current limiting resistor is responsive to a value of the replica current.

Figure 9:
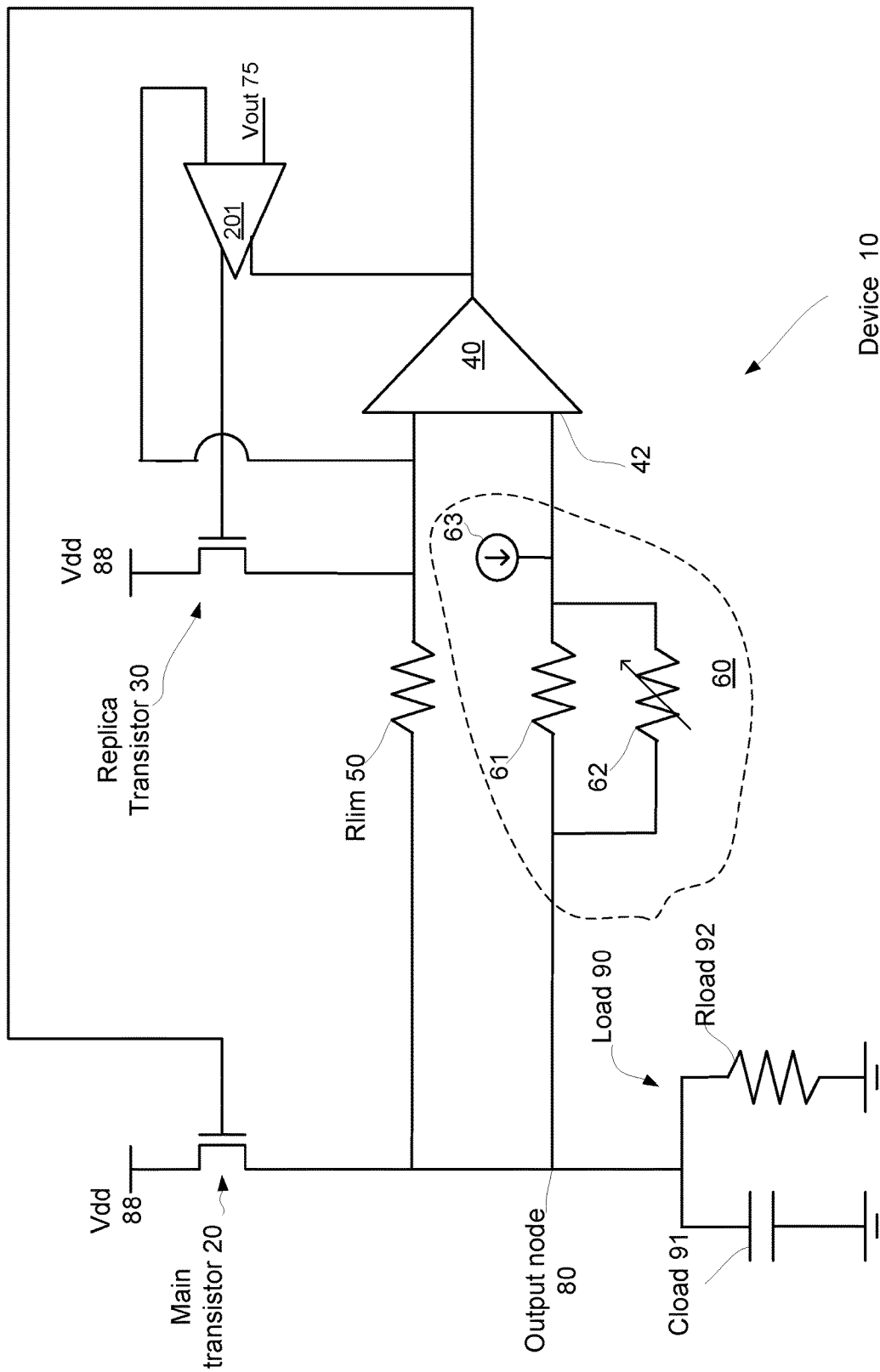
FIG. 9 is an example of a device.

FIG. 9 illustrates device 10. Device 10 of FIG. 9 differs from the device of FIG. 5 by including an additional amplifier 201. A first input of additional amplifier 201 is coupled to the first input 41 of amplifier 40. A second input of additional amplifier 201 receives Vout 75 from output node 80. The additional amplifier 201 has two output nodes that are coupled to the gate of replica transistor 30 and to the output of amplifier 40 respectively. The gain of additional amplifier 201 may equal one.

The additional amplifier 210 is an example for a circuit for cancelling the differences between the gain source voltage of main transistor 20 and the gate source voltage of the replica transistor 30.

Figure 10:
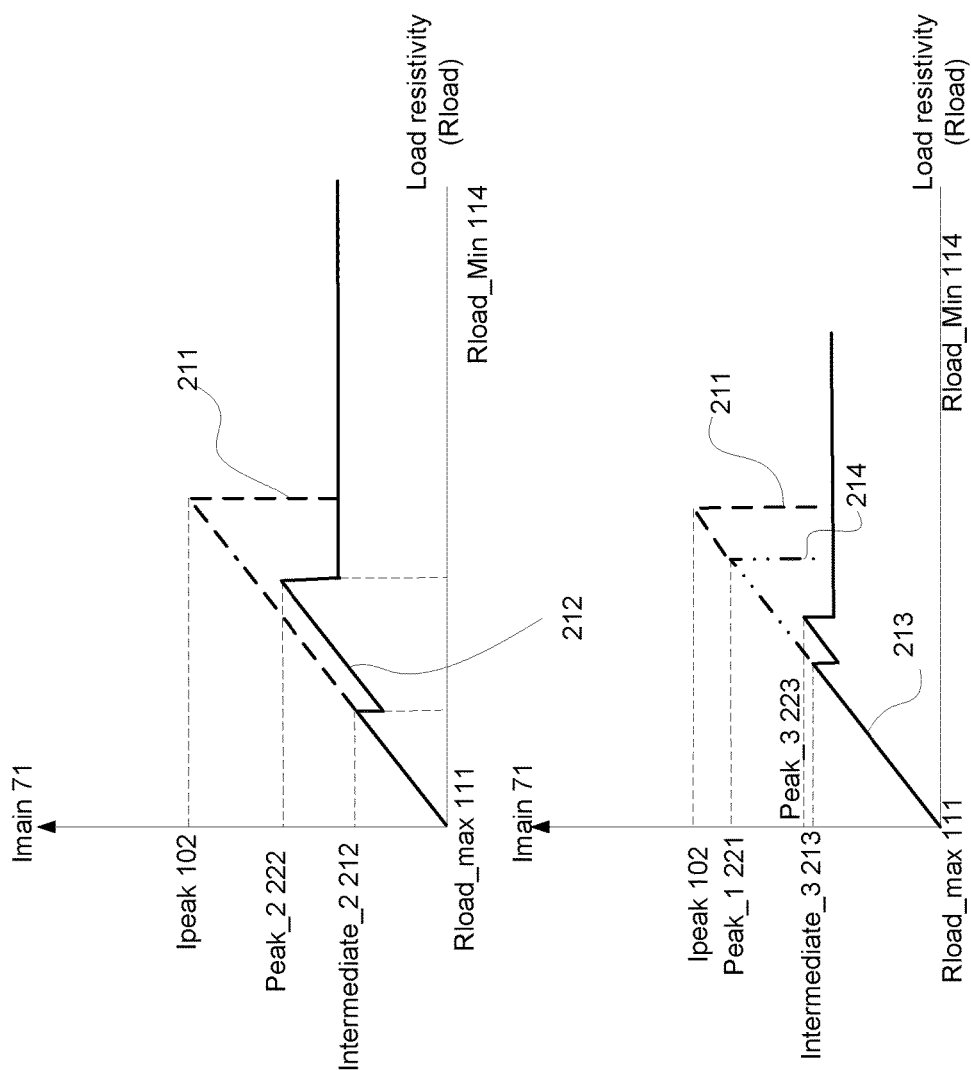
FIG. 10 illustrates various currents.

FIG. 10 illustrates three different scenarios.

FIG. 10 includes (a) graph 211 that illustrates a behavior of a prior art circuit and (b) graphs 212, 213 and 214 that illustrate three different scenarios that differ from each other by the value of Vref, by the values of their peaks and intermedia value.

Graph 212 has a peak value Peak_2 222 and an intermediate value Intermediate_2 212. Graph 214 has a peak value Peak_1 221. Graph 213 has a peak value Peak_3 223 and an intermediate value Intermediate_2 213.

Intermediate_2 212 and Intermediate_3 213 represent the minimal current for which the control circuit "wakes up" and starts to limit the load current.

In this mode, the main transistor 20 and the replica transistor 30 are between linear and saturation therefore RON is higher than in linear mode but still much lower than in saturation.

The values of Intermediate_2 212 and Intermediate_3 213 are approximately determined two different values of Vref.

Peak_1 221, Peak_2 222 and Peak_3 223 are the load current values for which the dynamic Vref reaches its maximum Vrefdyn=Vrefmax.

For each one of graphs 212 and 213 the difference between the peak value and the intermediate value is mostly determined by the slope of Vrefdyn and is a function of the Vds of main transistor 20.

The difference may be approximately determined by the voltage divider slope: R1/(R2+R1). For higher voltage divider slopes the difference will be smaller. The slope cannot be too sharp because it partially sets the Vrefmin.

Example

RONmain-transistor (assuming a linear mode)=20 mΩ
Ithe (expected current limit)=10 A
In this case Vds is about 10 A*20 m
Vrefmax=200 mV
Rlim=20 Ω
K (ratio between conductance of main and replica transistors)=1000

$$I_{thresh} = K * \frac{Vref_{MAX}}{Rlim} = 1000 \frac{200 \text{ mV}}{20 \text{ Ohm}} = 10A$$

$$I_{intermediate} = K_{(VDSerror=VREF\ min)} * \frac{Vref_{MIN}}{R\lim} = 10A$$

Accordingly, from the last equation the Vrefmin can be found empirically or by calculation Vref min Trade-offs: (i) If Vrefmin is too high then the ratio error too high and we can obtain a high peak current. (ii) If Vrefmin is too low the control circuit will react early and the RONmain-transistor becomes larger than 20 mΩ for lower load currents.

Ipeak is dependent on VREF vs VDS function. For example—it maybe it will be dependent on resistor divider ratio (resistors 64 and 65) of FIG. 6.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device for overcurrent protection, the device comprises:
   a main transistor that is configured to supply, via an output node, a load current to a load;
   a current limiting resistor;
   a replica transistor that is configured to provide a replica current to the current limiting resistor; wherein the replica current is smaller than the load current, wherein a value of the replica current is responsive to a value of the load current;
   an amplifier;
   a current limiting transistor;
   a variable signal source that is configured to output a reference signal; wherein a value of the reference signal is based on a main transistor voltage; wherein the reference signal is a reference voltage; wherein the reference signal source is configured to provide a reference voltage of a first value when the load current is smaller by a first amount than a first load current threshold and is configured to provide a reference voltage of a second value when the load current exceeds by a second amount the first load current threshold;
   wherein the amplifier is configured to prevent the load current from exceeding the first load current threshold by biasing the main transistor and the replica transistor with a bias signal; wherein a value of the bias signal is responsive to the reference signal and to the replica current.

2. The device according to claim 1, wherein the control device is configured to gradually change the value of the reference voltage between the first value and the second value.

3. The device according to claim 2, wherein the main circuit comprises a main transistor; wherein the reference signal source is configured to output the reference signal source of the first value when the main transistor operates in a linear mode and is configured to output the reference signal of the second value when the main transistor operates in a saturation mode.

4. A device for overcurrent protection, the device comprises:
   a main circuit that is configured to supply, via an output node, a load current to a load;
   a replica circuit that is configured to provide a replica current that is smaller than the load current, wherein a value of the replica current is responsive to a value of the load current; and
   a control circuit that is configured to prevent the load current from exceeding a first load current threshold by biasing the main circuit and the replica circuit, wherein the biasing is responsive to a difference between (i) a reference voltage provided by a reference signal source of the control circuit and (ii) a voltage that is developed on a current limiting resistor, wherein the voltage that is developed on the current limiting resistor is responsive to a value of the replica current; wherein the reference signal source is a variable reference signal source.

5. The device according to claim 4 wherein the control circuit is configured to determine a value of the reference voltage based on a main circuit voltage.

6. The device according to claim 5 wherein the control circuit is configured to change the value of the reference voltage between a first value and a second value, wherein the second value exceeds the first value.

7. The device according to claim 6 wherein the reference signal source is configured to provide the reference voltage of the first value when the load current is smaller by a first amount than the first load current threshold and is configured to provide the reference voltage of the second value when the load current exceeds by a second amount the first load current threshold.

8. The device according to claim 6, wherein the control device is configured to gradually change the value of the reference voltage between the first value and the second value.

9. The device according to claim 6, wherein the main circuit comprises a main transistor; wherein the reference signal source is configured to output the reference signal source of the first value when the main transistor operates in a linear mode and is configured to output the reference signal of the second value when the main transistor operates in a saturation mode.

10. The device according to claim 4, wherein the reference signal source comprises a current source and a fixed resistor that is coupled in parallel to a variable resistor.

11. The device according to claim 10, wherein the variable resistor has a resistance that is responsive to a value of a main circuit voltage.

12. The device according to claim 4, wherein the control circuit comprises an amplifier, a current limiting resistor that is coupled between the output node and a first input of the amplifier; and wherein the reference signal source is coupled between the output node and a second input of the amplifier.

13. The device according to claim 12, wherein the amplifier comprises an amplifier output that is configured to outputs a bias signal to the main circuit and to the replica circuit.

14. A method for overcurrent protection, the device comprises:
   supplying, by a main transistor and via an output node, a load current to a load;
   providing, by a replica transistor, a replica current to a current limiting resistor; wherein the replica current is smaller than the load current, wherein a value of the replica current is responsive to a value of the load current;
   outputting, by a variable signal source, a reference signal; wherein a value of the reference signal is based on a main transistor voltage; wherein the reference signal is a reference voltage; wherein the outputting comprises providing a reference voltage of a first value when the load current is smaller by a first amount than a first load current threshold, and providing a reference voltage of a second value when the load current exceeds by a second amount the first load current threshold;
   preventing, by an amplifier, the load current from exceeding a first load current threshold by biasing the main transistor and the replica transistor with a bias signal; wherein a value of the bias signal is responsive to the reference signal and to the replica current.

* * * * *